(12) United States Patent
Wada

(10) Patent No.: US 7,587,680 B2
(45) Date of Patent: Sep. 8, 2009

(54) INFORMATION DISPLAYING APPARATUS, INFORMATION DISPLAYING PROGRAM AND STORAGE MEDIUM

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 538 days.

(21) Appl. No.: 11/028,979

(22) Filed: Jan. 4, 2005

(65) Prior Publication Data

US 2006/0107207 A1    May 18, 2006

(30) Foreign Application Priority Data

Jan. 19, 2004    (JP)    ............... 2004-010764

(51) Int. Cl.
*G06F 3/048*    (2006.01)
*G10H 7/00*    (2006.01)

(52) U.S. Cl. .................. 715/804; 715/781; 715/790; 715/835; 715/853; 84/645

(58) Field of Classification Search ......... 715/712–716, 715/721, 835, 839, 723, 781, 804, 853–855, 715/790; 84/645
See application file for complete search history.

(56) References Cited

U.S. PATENT DOCUMENTS

| | | | | |
|---|---|---|---|---|
| 5,638,523 A | * | 6/1997 | Mullet et al. ................. | 715/855 |
| 5,680,558 A | * | 10/1997 | Hatanaka et al. ............. | 715/838 |
| 6,160,554 A | * | 12/2000 | Krause ........................ | 715/804 |
| 6,225,546 B1 | * | 5/2001 | Kraft et al. .................... | 84/609 |
| 6,262,724 B1 | * | 7/2001 | Crow et al. ................... | 715/723 |
| 6,816,174 B2 | * | 11/2004 | Tiongson et al. ............. | 715/787 |
| 7,007,246 B2 | * | 2/2006 | Yamaguchi et al. .......... | 715/864 |
| 7,100,105 B1 | * | 8/2006 | Nishimura et al. ........... | 715/512 |
| 2001/0056434 A1 | * | 12/2001 | Kaplan et al. ............ | 707/104.1 |
| 2004/0095396 A1 | * | 5/2004 | Stavely et al. ............... | 345/838 |

FOREIGN PATENT DOCUMENTS

JP    2003-015923    1/2003

OTHER PUBLICATIONS

Mander et al., "A "pile" metaphor for supporting casual organization of information", Proceedings of the SIGCHI conference on Human factors in computing systems, ACM 1992, pp. 627-634.*

* cited by examiner

*Primary Examiner*—William L Bashore
*Assistant Examiner*—Andrew Tank
(74) *Attorney, Agent, or Firm*—Straub & Pokotylo; John C. Pokotylo

(57) ABSTRACT

An information displaying apparatus includes a mark displaying unit which displays on a display a file mark to identify each of files stored in a file memory and a folder mark to identify a folder by which the files are grouped, a viewer generating unit which generates on the display a viewer to display one of information about the files included in the folder and information included in the files, a viewer moving unit which moves the viewer on the display in accordance with an operation of an operating member, and a preview displaying unit which displays a file mark included in the folder when the viewer overlaps the folder mark displayed on the display and displays information included in the file as an image when the viewer overlaps the file mark.

18 Claims, 19 Drawing Sheets

16

Folder view

● Display of icon

○ Display of file name

○ Display of icon and file name

File view

○ Display of icon

○ Display of file information

● Display of icon and file information

Display a plurality of previews

Setting

⊗ Dtection point

INFORMATION DISPLAYING APPARATUS, INFORMATION DISPLAYING PROGRAM AND STORAGE MEDIUM

CROSS-REFERENCE TO RELATED APPLICATIONS

This application is based upon and claims the benefit of priority from prior Japanese Patent Application No. 2004-010764, filed Jan. 19, 2004, the entire contents of which are incorporated herein by reference.

BACKGROUND OF THE INVENTION

1. Field of the Invention

The present invention relates to a technology to display information stored in a storage unit of a computer or the like and, more particularly, to an information displaying technology to retrieve desired information including dynamic information as well as static information with efficiency.

2. Description of the Related Art

Conventionally, the following operation has been performed in order to retrieve a desired file from the files stored in a storage unit of a computer or the like.

First, a user points a folder that appears to include a desired file in view of a folder tree with a pointing device such as a mouse. Then, the user selects and opens the folder pointed with the click of the button of the mouse to display a list of files included in the folder in the form of icons or the like. If one of the files is considered to be a target one, the user points it with the pointing device. Then, the user clicks the button of the mouse to display a preview of the file on a preview window and starts software by which the file is created to display the file or play it back.

The user repeats the above procedure until he or she can find a desired file. If the desired file is not included in the selected folder, the user selects another folder and repeats the above procedure. In order to retrieve a file, an operation of selecting and opening a point had to be repeated over and over again.

There is proposed a technology to allow a user to understand various items of information about files selected by operating a pointing device such as a mouse only by seeing a cursor on a monitor screen (Jpn. Pat. Appln. KOKAI Publication No. 2003-15923).

BRIEF SUMMARY OF THE INVENTION

According to a first aspect of the present invention, there is provided an information displaying apparatus including a file memory which stores files hierarchically, an information reading unit which reads information of the files from the file memory, and a display which displays the information of the files read by the information reading unit, comprising a mark displaying unit which displays on the display a file mark to identify each of the files stored in the file memory and a folder mark to identify a folder by which the files are grouped, a viewer generating unit which generates on the display a viewer to display one of information about the files included in the folder and information included in the files, a viewer moving unit which moves the viewer on the display in accordance with an operation of an operating member, and a preview displaying unit which displays a file mark included in the folder when the viewer overlaps the folder mark displayed on the display and displays information included in the file as an image when the viewer overlaps the file mark.

According to a first aspect of the present invention, there is provided an information displaying program of an information displaying apparatus including a file memory which stores files hierarchically and a display which displays information of the files stored in the file memory, the program causing a computer to perform a mark displaying process of displaying on the display a file mark to identify each of the files stored in the file memory and a folder mark to identify a folder by which the files are grouped, a viewer generating process of generating on the display a viewer to display one of information about the files included in the folder and information included in the files, a viewer moving process of moving the viewer on the display, and a preview displaying process of displaying a file mark included in the folder when the viewer moves and overlaps the folder mark displayed on the display and displays information included in the file within the viewer as an image when the viewer moves and overlaps the file mark displayed on the display.

According to a first aspect of the present invention, there is provided a recording medium that records an information displaying program of an information displaying apparatus including a file memory which stores files hierarchically and a display which displays information of the files stored in the file memory, the information displaying program of the recording medium causing a computer to perform a mark displaying process of displaying on the display a file mark to identify each of the files stored in the file memory and a folder mark to identify a folder by which the files are grouped, a viewer generating process of generating on the display a viewer to display one of information about the files included in the folder and information included in the files, a viewer moving process of moving the viewer on the display, and a preview displaying process of displaying a file mark included in the folder when the viewer moves and overlaps the folder mark displayed on the display and displays information included in the file within the viewer as an image when the viewer moves and overlaps the file mark displayed on the display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

In an information displaying method according to an embodiment of the present invention, a user operates an information processing apparatus to display information on an information displaying screen displayed on a display unit of the information processing apparatus.

Figure 1:
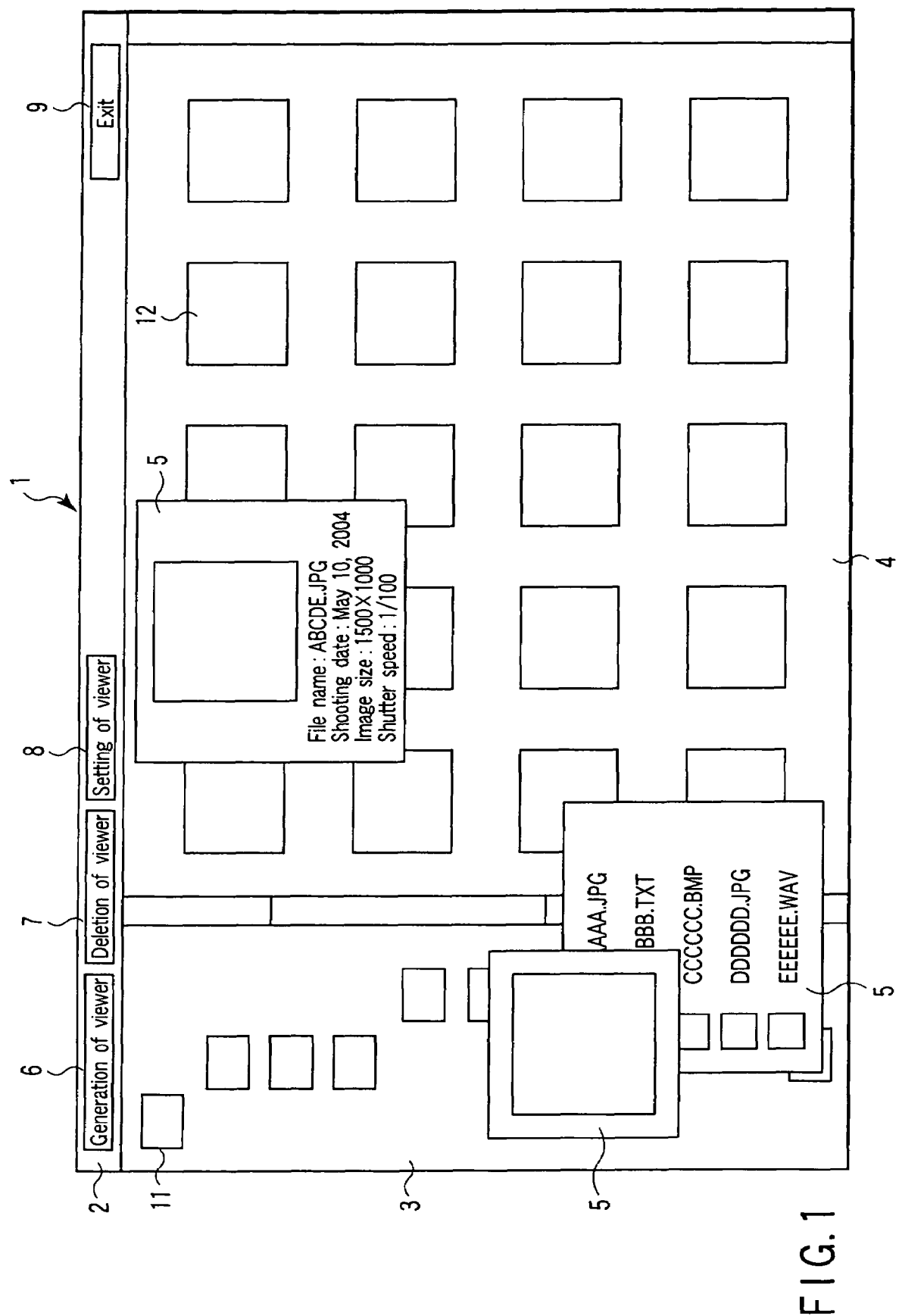
FIG. 1 is a diagram showing a configuration of an information displaying screen formed by an information displaying method according to an embodiment of the present invention.

FIG. 1 is a diagram showing a configuration of the information displaying screen formed by the information displaying method according to the embodiment of the present invention.

The information displaying screen 1 includes a tool bar area 2 for performing an operation to display information, a folder area 3 for displaying a tree structure of folders that store files, a file area 4 for displaying the files stored in a selected folder and a viewer 5 for displaying information about the files and the like.

The tool bar area 2 has a viewer generating button 6, a viewer deleting button 7, a viewer setting button 8 and an exit button 9. The viewer 5 can be set and operated by these operation buttons 6 to 9. FIG. 1 shows a plurality of viewers 5. The viewers 5 display a preview of information included in a file and file information about the file.

Referring next to FIG. 1, the general outline of the information displaying method will be described.

When a user displays the information displaying screen 1, the folders stored in the information displaying apparatus are displayed in the folder area 3 as a tree structure of folder icons 11.

When the user specifies a folder icon 11 with a click, the file icons 12 of files included in the folder are displayed in the file area 4. A plurality of folder icons 11 can be selected in order to specify their folders, and the file icons 12 of all files included in the folders are displayed in the file area 4. If a folder includes a sub-folder when it is specified, the file icons 12 of files stored in the sub-folder can be displayed in the file area 4. The icons are not limited to graphics but can be formed of characters such as file names if they can specify a range on the screen.

When the user depresses the viewer generating button 6, the viewer 5 is displayed within the information displaying screen 1. If the user drags the viewer 5 while depressing the button, the viewer 5 can be moved to any position within the information displaying screen 1.

Figure 2:
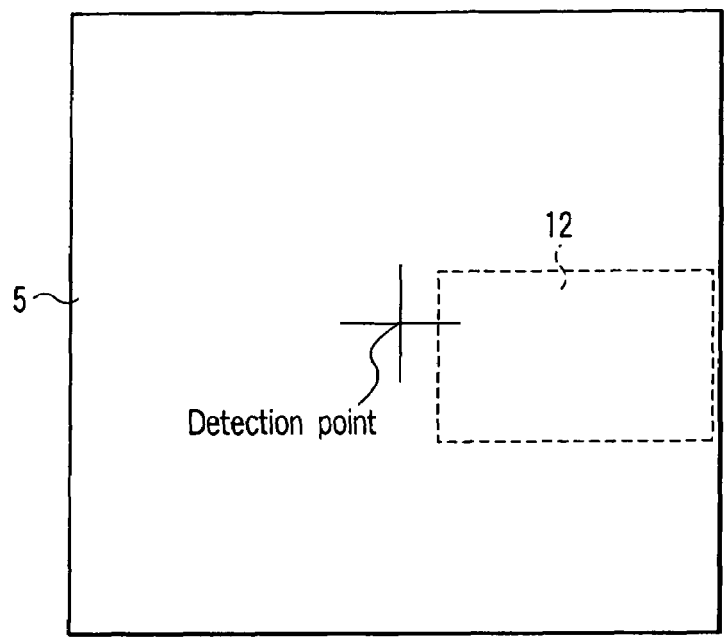
FIG. 2 is a diagram showing a detection point of a viewer.

The viewer 5 has a detection point in advance as shown in FIG. 2. When the detection point of the viewer 5 is located on a file icon 12 on the screen, data of a file corresponding to the icon is displayed. On the other hand, when the detection point of the viewer 5 is not located on the file icon 12 on the screen, the viewer 5 becomes translucent and concurrently a mark indicating the detection point is displayed.

Figure 3:
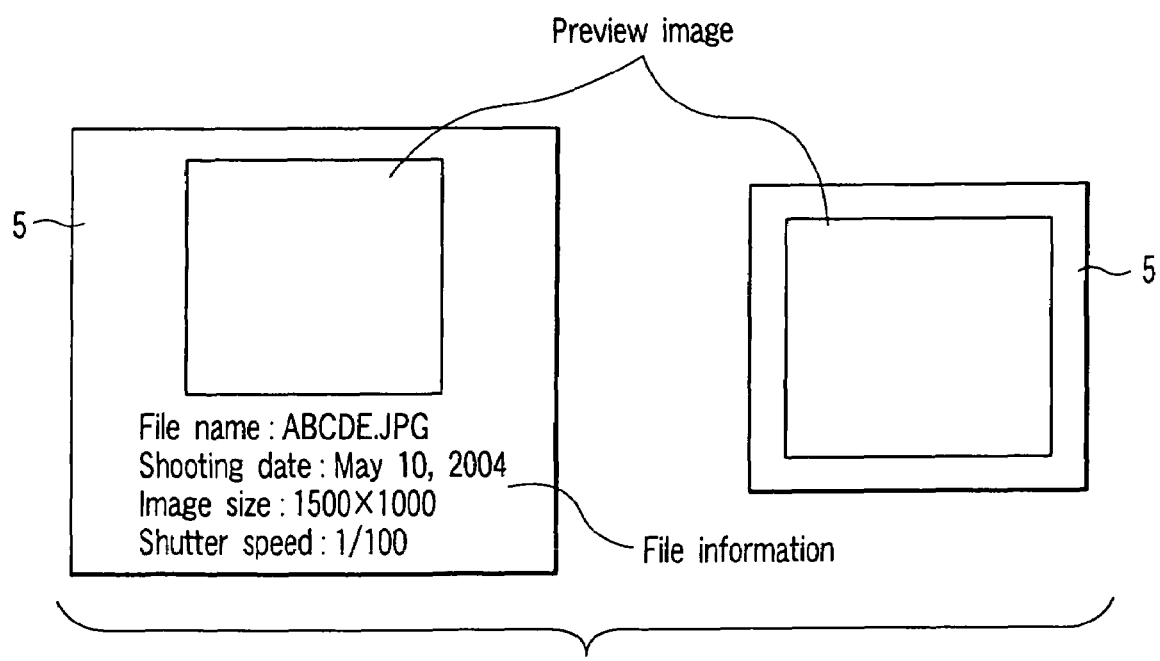
FIG. 3 is a diagram illustrating a type of each of viewers.

FIG. 3 is a diagram illustrating a type of each of the viewers 5 in the file area 4. The viewer 5 shown on the left-hand side of FIG. 3 displays a preview image indicating (part of) the contents of a file and file information concerning the file. The viewer 5 shown on the right-hand side of FIG. 3 displays only the preview image. The user can determine which of the viewers 5 is displayed using the viewer setting button 8.

When the detection point of the viewer 5 is located on a folder icon 11 on the screen, a reduced icon of a file included in a folder corresponding to the icon is displayed within the viewer 5.

Figure 4:
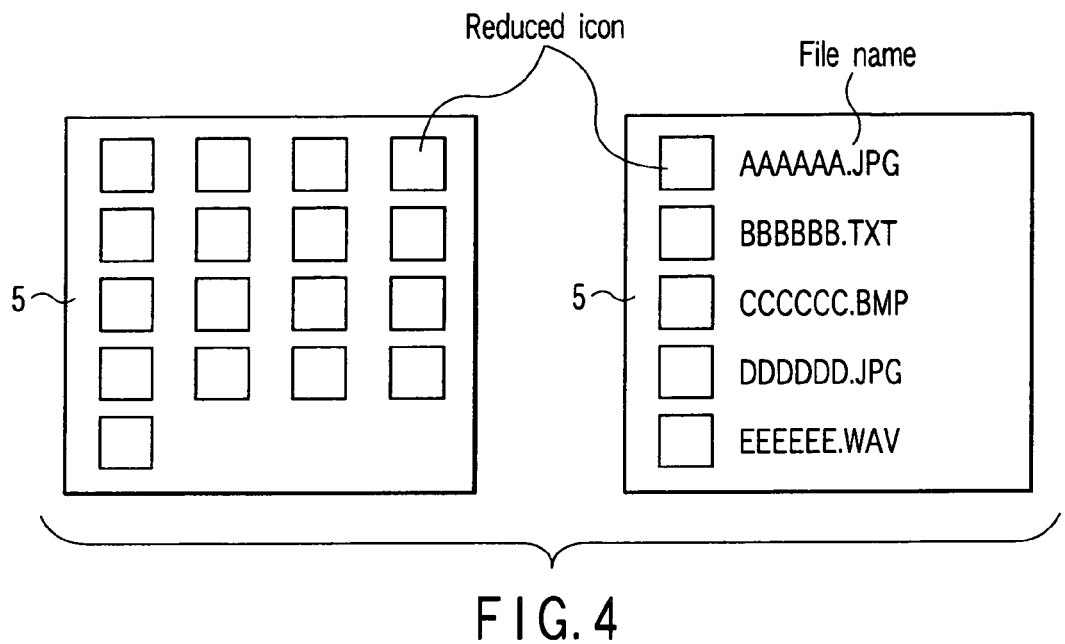
FIG. 4 is a diagram illustrating a type of each of viewers.

FIG. 4 is a diagram illustrating a type of each of the viewers 5 in the folder area. The viewer 5 shown on the left-hand side of FIG. 4 displays reduced icons of files. This display allows the user to confirm the types of files included in the folder. The viewer 5 shown on the right-hand side of FIG. 4 displays reduced icons of files and their file names. The user can determine which of the viewers 5 is displayed using the viewer setting button 8.

In FIG. 1, two viewers 5 overlap with each other in the folder area 3. The lower viewer 5 displays reduced icons of files stored in the folder and their file names, while the upper viewer 5 displays data of the files corresponding to the reduced icons. Thus, the viewers 5 can serve to display information belonging to a one level lower in the hierarchy.

Figure 5:
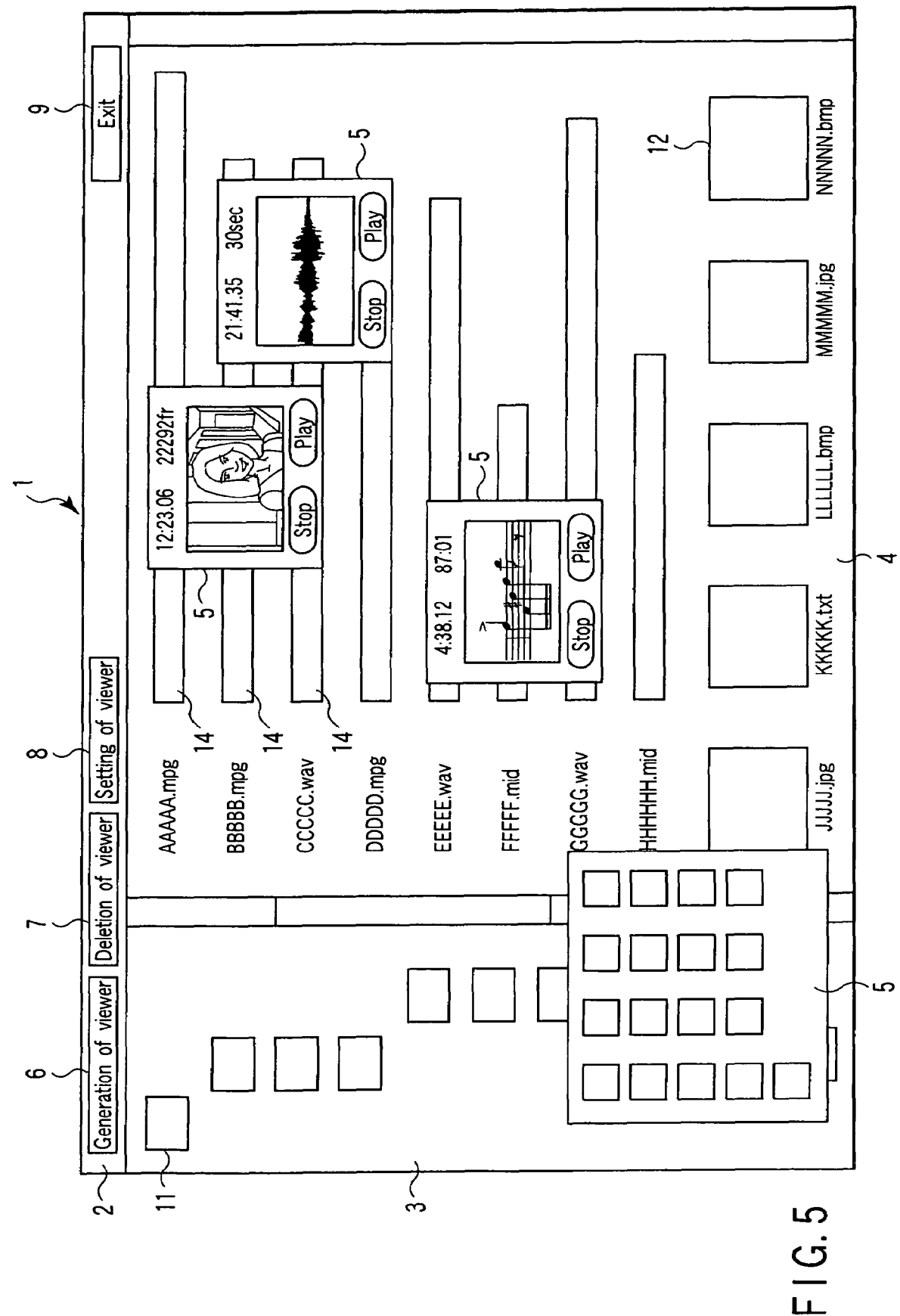
FIG. 5 is a diagram showing a configuration of the information displaying screen formed when dynamic information is displayed.

FIG. 5 is a diagram showing a configuration of the information displaying screen 1 formed when dynamic information is displayed. Since the basic configuration of the information displaying screen 1 is the same as the configuration described with reference to FIG. 1, its detailed descriptions are omitted. The dynamic information represents information that varies with time and includes moving images, sound and musical performance data.

When the user specifies a folder icon 11 with a click, the file icons 12 of files included in the folder are displayed in the file area 4. If the files include dynamic information, time line icons 14 are displayed together with file names. The time line icons 14 are band-shaped icons that are lengthened in a lateral direction, and the length of each of the icons 14 represents playback time.

When the user moves the detection point of the viewer 5 into the range of a time line icon 14, the viewer 5 displays information of time position that is determined by the position of the detection point on the icon. When the user depresses a playback button of the viewer 5, moving images, sound and musical performance data are played back in accordance with the property of the files, and the viewer 5 moves on the time line icon 14 as playback time elapses.

Figure 6:
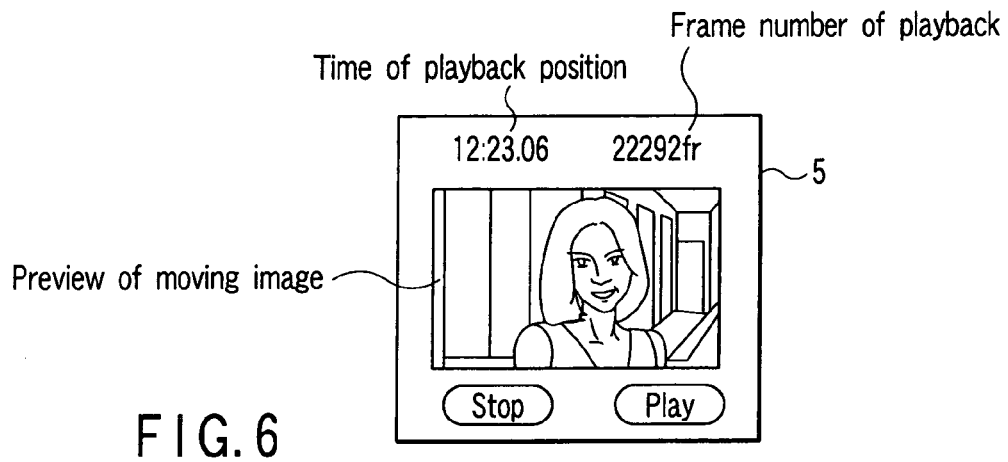
FIG. 6 is a diagram of the viewer for playing back a moving image.

FIG. 6 is a diagram of the viewer 5 for playing back a moving image. The viewer 5 displays a reduced image of one frame of the moving image together with time corresponding to a playback position and a frame number indicating the playback position. The time of the playback position and the frame number thereof are updated in accordance with a lapse of playback time of the moving image.

Figure 7:
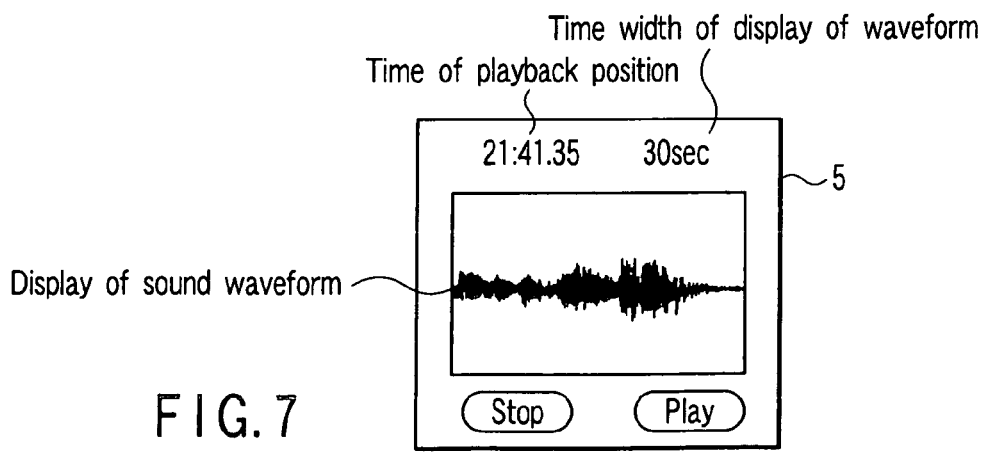
FIG. 7 is a diagram of the viewer for playing back sound.

FIG. 7 is a diagram of the viewer 5 for playing back sound. The viewer 5 displays a reduced image representing a sound waveform together with time corresponding to a playback position and a time width of display of the waveform. The time corresponding to a playback position is updated in accordance with a lapse of playback time of the sound.

Figure 8:
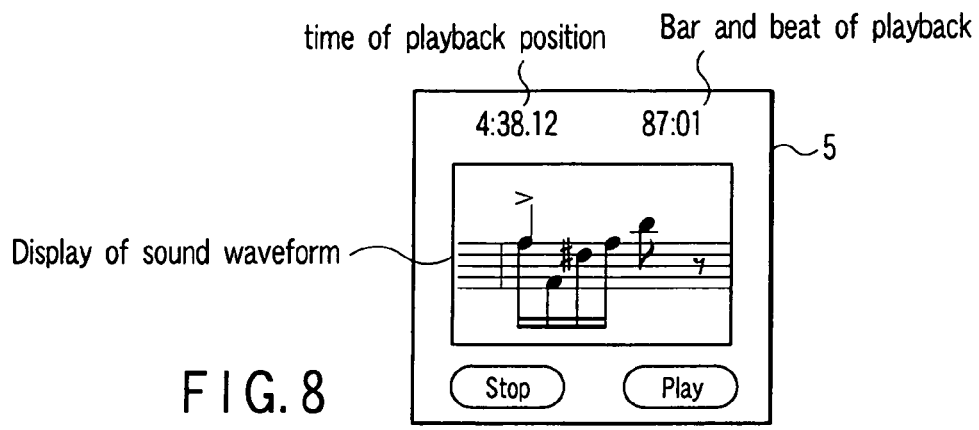
FIG. 8 is a diagram of the viewer for playing back musical performance data.

FIG. 8 is a diagram of the viewer 5 for playing back musical performance data. The viewer 5 displays part of music corresponding to a playback (performance) position and time corresponding to the playback position together with a bar number and a beat number both corresponding to the playback position. The time, bar and beat corresponding to the playback position are updated in accordance with a lapse of playback time of the musical performance data.

Figure 9:
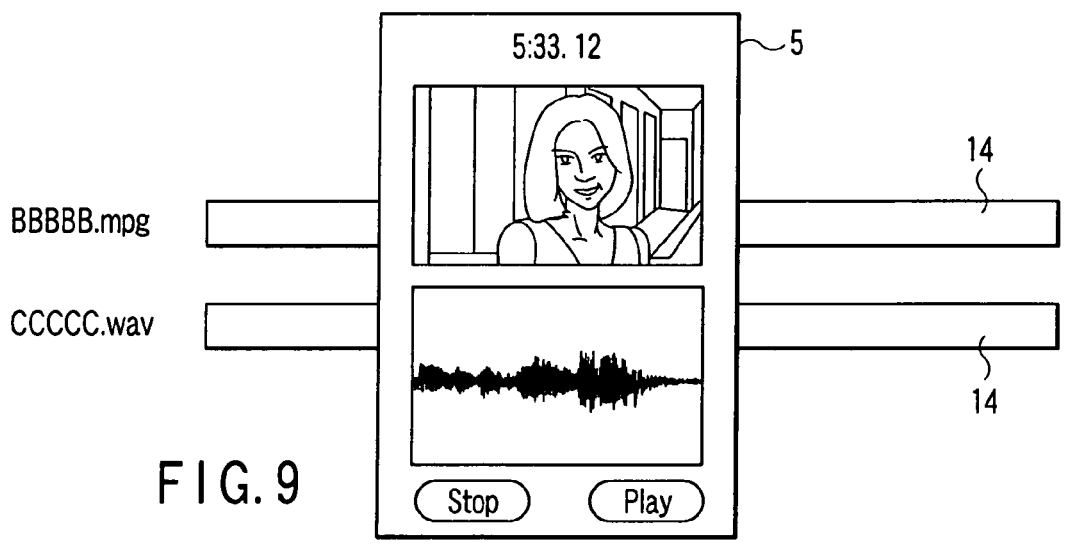
FIG. 9 is a diagram of the viewer for playing back a moving image and sound at the same time.

The moving image and sound can be played back at the same time in association with each other. FIG. 9 is a diagram of the viewer 5 for playing back a moving image and sound at the same time. The viewer 5 displays a reduced image of one frame of the moving image and a reduced image representing a waveform of the sound and moves on the time line icon 14 as playback time elapses.

The configuration of an information displaying apparatus for achieving the above-described information displaying method and the principal procedure thereof will be described.

Figure 10:
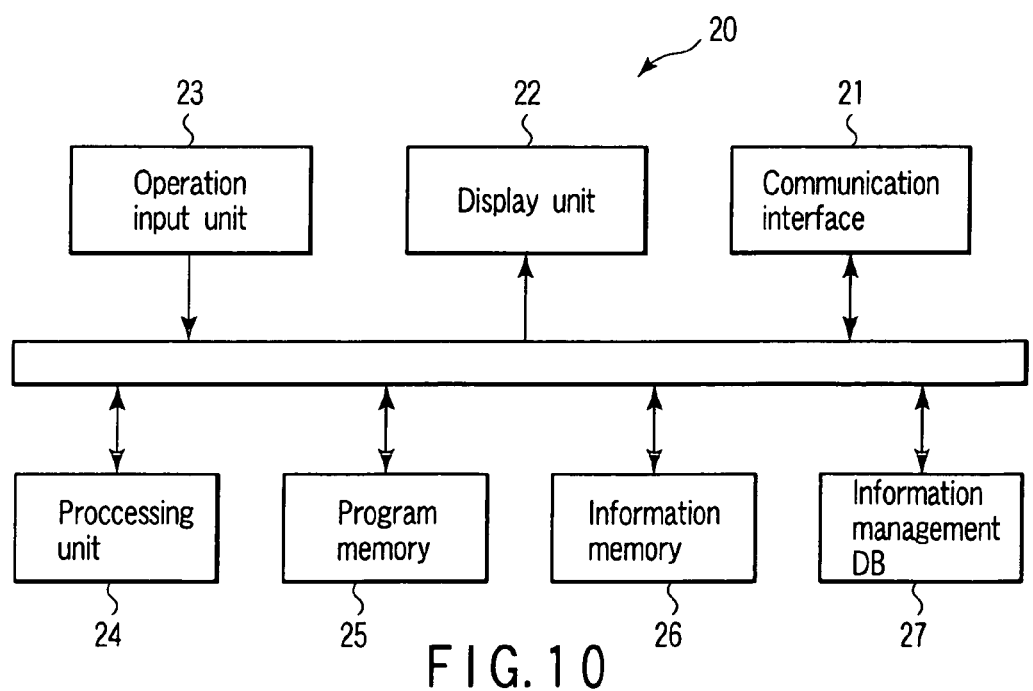
FIG. 10 is a diagram showing a configuration of an information displaying apparatus.

FIG. 10 is a diagram showing a configuration of an information displaying apparatus 20. The information displaying apparatus 20 includes a communication interface 21, a display unit 22, an operation input unit 23, a processing unit 24, a program memory 25, an information memory 26 and an information management DB 27.

The communication interface 21 is an interface for transmitting/receiving information to/from an external device (not shown) by communications. The display unit 22 displays the information displaying screen 1. The operation input unit 23 is a man-machine interface for receiving an operation instruction from a user.

The processing unit 24 controls the operations of the information displaying apparatus 20 as a whole. The program memory 25 stores programs for controlling the respective functions of the information displaying apparatus 20. The information memory 26 stores information such as files that can be operated by the information displaying unit 20, structures about folders and file information. The information management DB 27 stores management information used for processing of the information displaying unit 20. Not only the information in the information displaying unit 20 but also the information stored in an external information processing apparatus (not shown) connected through the communication interface 21 can be stored in the information management DB 27.

Figure 11:
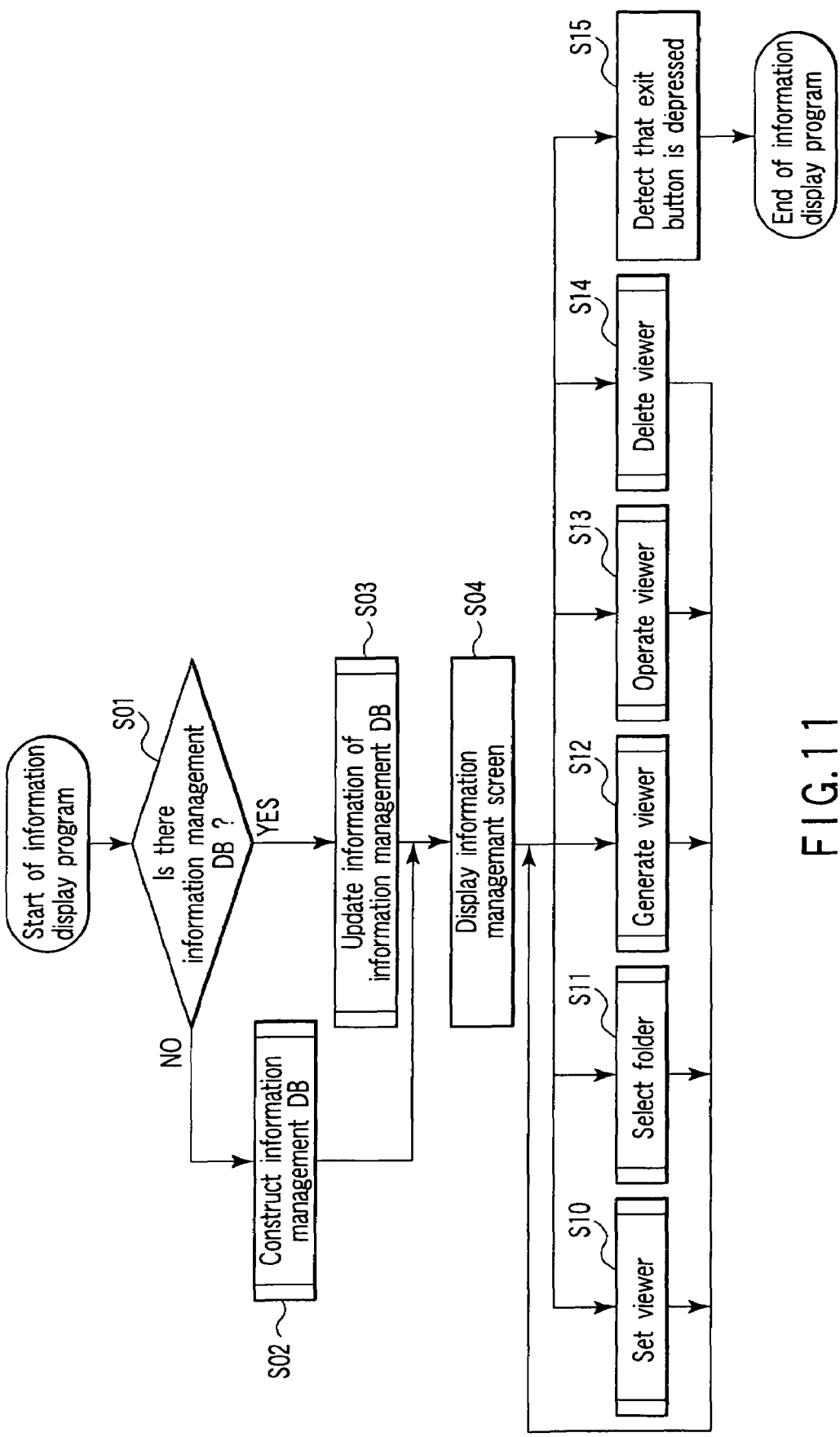
FIG. 11 is a schematic flowchart showing a procedure for performing a process of executing information displaying programs.

FIG. 11 is a schematic flowchart showing a procedure for executing information displaying programs for displaying information. The following is a process of performing the principal ones of information displaying programs according to the present invention. The functions that have been described with reference to FIGS. 1 to 9 are included in the information displaying programs according to the present invention even though they are not described below.

When a user gives an instruction to display the information displaying screen 1 from the operation input unit 23, an information displaying program starts. In step S01, the program checks whether the information management DB 27 has been created in the information displaying apparatus 20. If not yet, a process of constructing an information management DB is performed in step S02.

Figure 12:
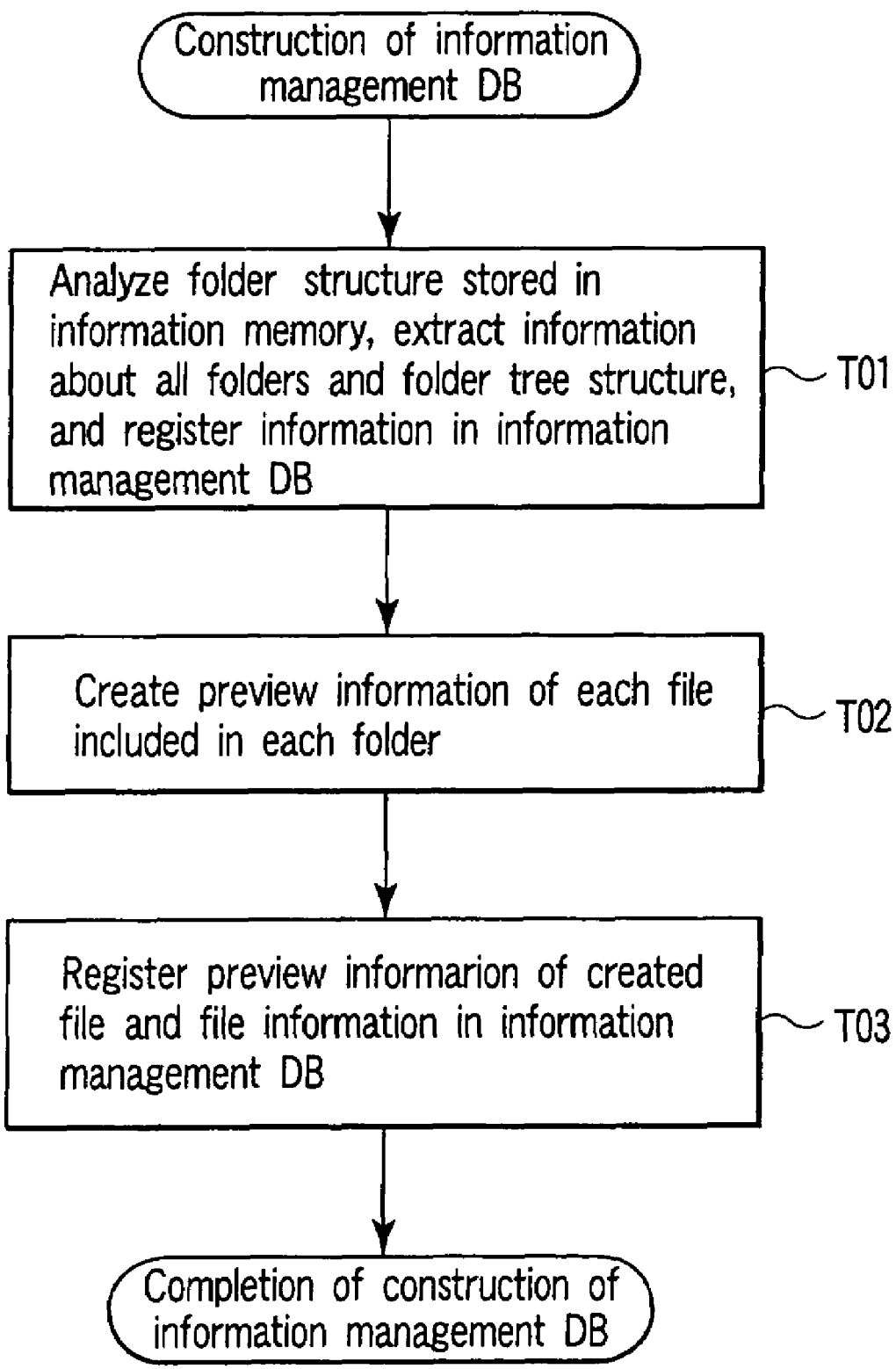
FIG. 12 is a schematic flowchart showing a procedure for performing a process of constructing an information management DB.

FIG. 12 is a schematic flowchart showing a procedure for performing a process of constructing the information management DB.

In step T01, the information displaying program analyzes the folder structure stored in the information memory 26. The program extracts information about all folders and a folder tree structure and registers the information in the information management DB.

In step T02, preview information is created for each of files included in each of the folders. In other words, a thumbnail image is formed if the information displayed on the viewer 5 is an image file. There are files for which no preview information is created.

In step T03, the created preview information and its corresponding file information are registered in the information management DB. And the process returns.

Figure 13:
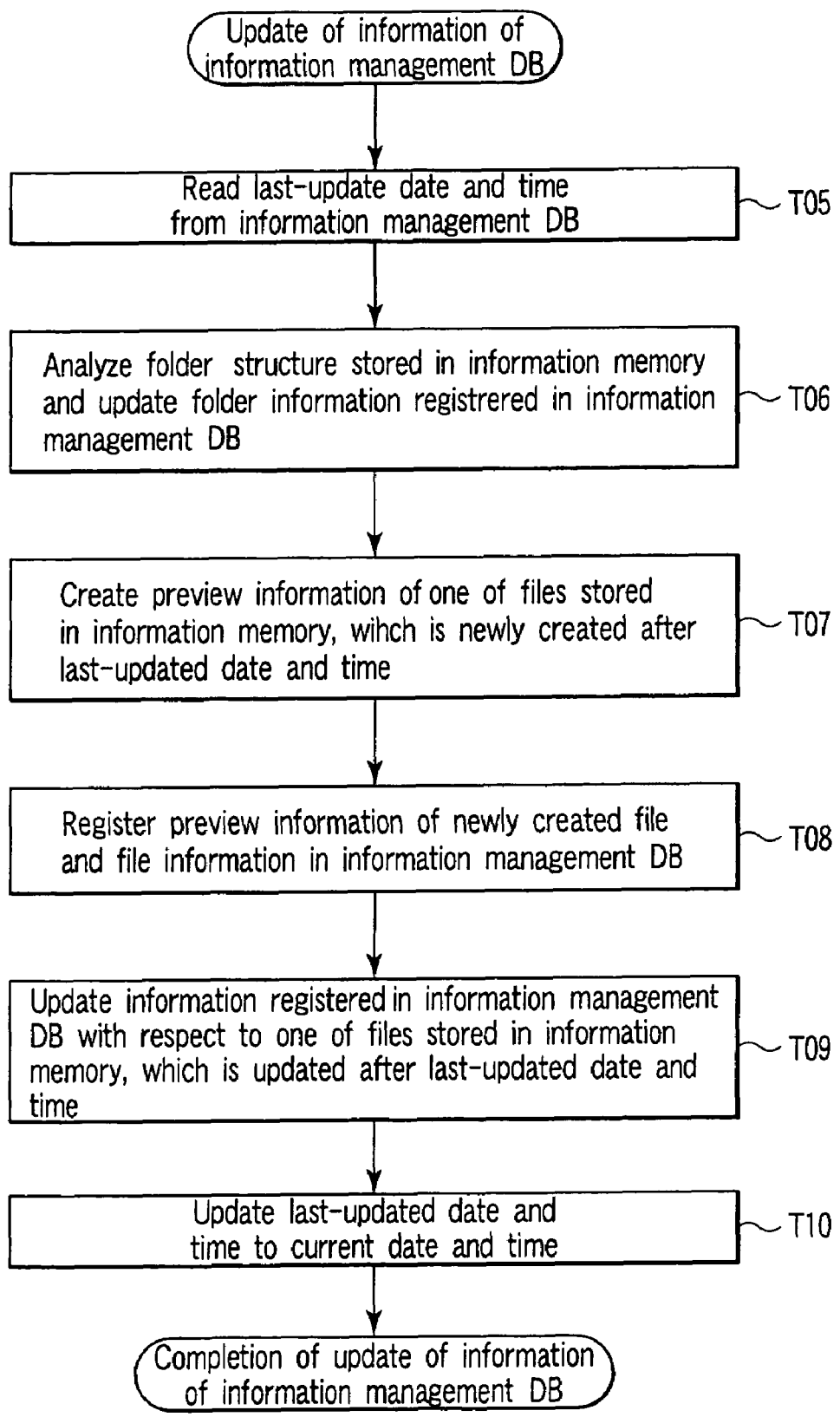
FIG. 13 is a schematic flowchart showing a procedure for performing a process of updating information of the information management DB.

Returning to FIG. 11, when the information management DB has been created in step S01, a process of updating information of the information management DB 27 is performed in step S03. FIG. 13 is a schematic flowchart showing a procedure for performing a process of updating information of the information management DB 27.

In step T05, the information displaying program reads information about the last-updated date and time of the information management DB 27. In step T06, the program analyzes the folder structure stored in the information memory 26 and updates the folder information registered in the information management DB 27.

In step T07, preview information of one of files stored in the information memory 26, which is newly created after the last-updated date and time, is prepared. In step T08, the preview information of the newly created file and its corresponding file information are registered in the information management DB.

In step T09, the information registered in the information management DB 27 is updated and deleted with respect to one of files stored in the information memory 26, which is updated and deleted after the last-updated date and time. In step T10, the last-updated date and time is updated to the current date and time.

Figure 14:
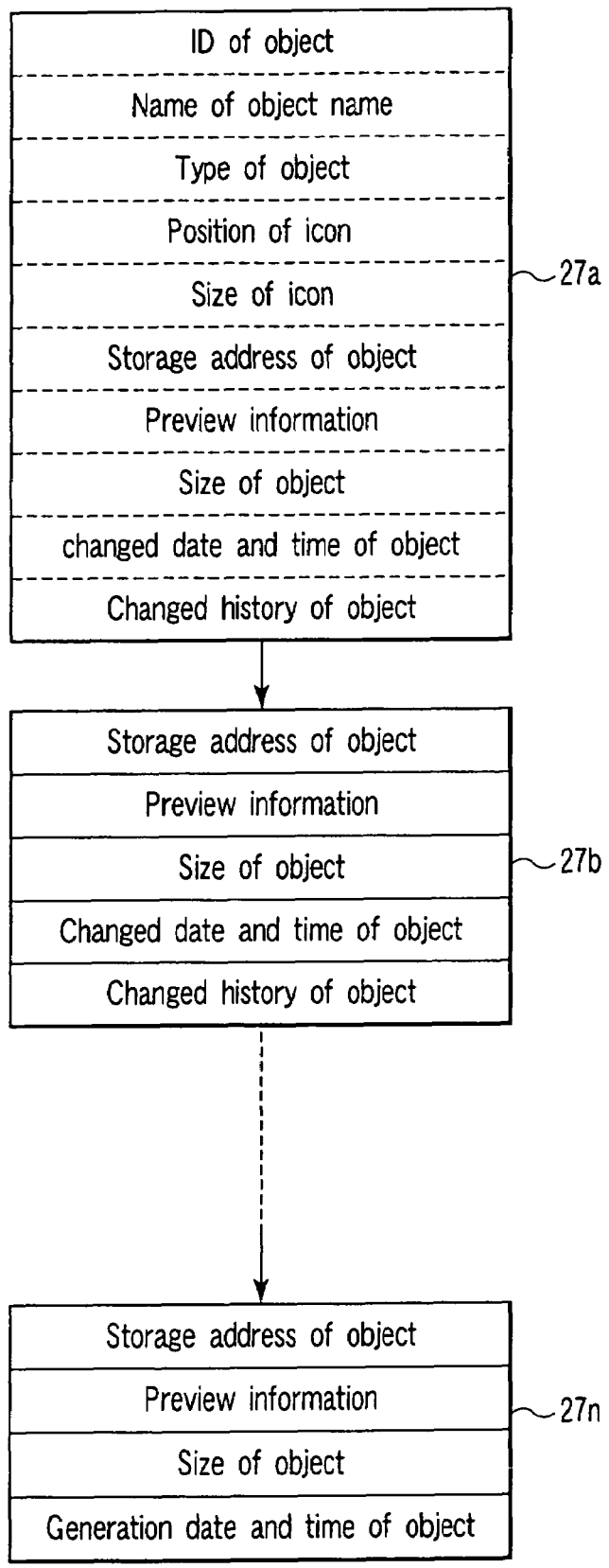
FIG. 14 is a table showing object information of files registered in the information management DB.

FIG. 14 is a table showing object information of the files registered in the information management DB. When a file is newly created, only management information 27*a* that describes preview information and file information of the newly created file is created. After that, management information 27*b*, . . . 27*n* whose preview information and file information are updated is created each time the contents of the file are updated. The updated management information 27*b*, . . . 27*n* is also stored in the information management DB 27 as history information.

Returning to FIG. 11, in step S04, the information displaying program displays the information displaying screen 1. In the folder area 3 of the information displaying screen 1, the folder icons 11 are displayed in accordance with the folder tree structure.

The user operates the viewer generating button 6, viewer deleting button 7, viewer setting button 8 and exit button 9 provided in the tool bar area 2 of the information displaying screen 1 or selects a folder to retrieve a desired file.

Figure 15:
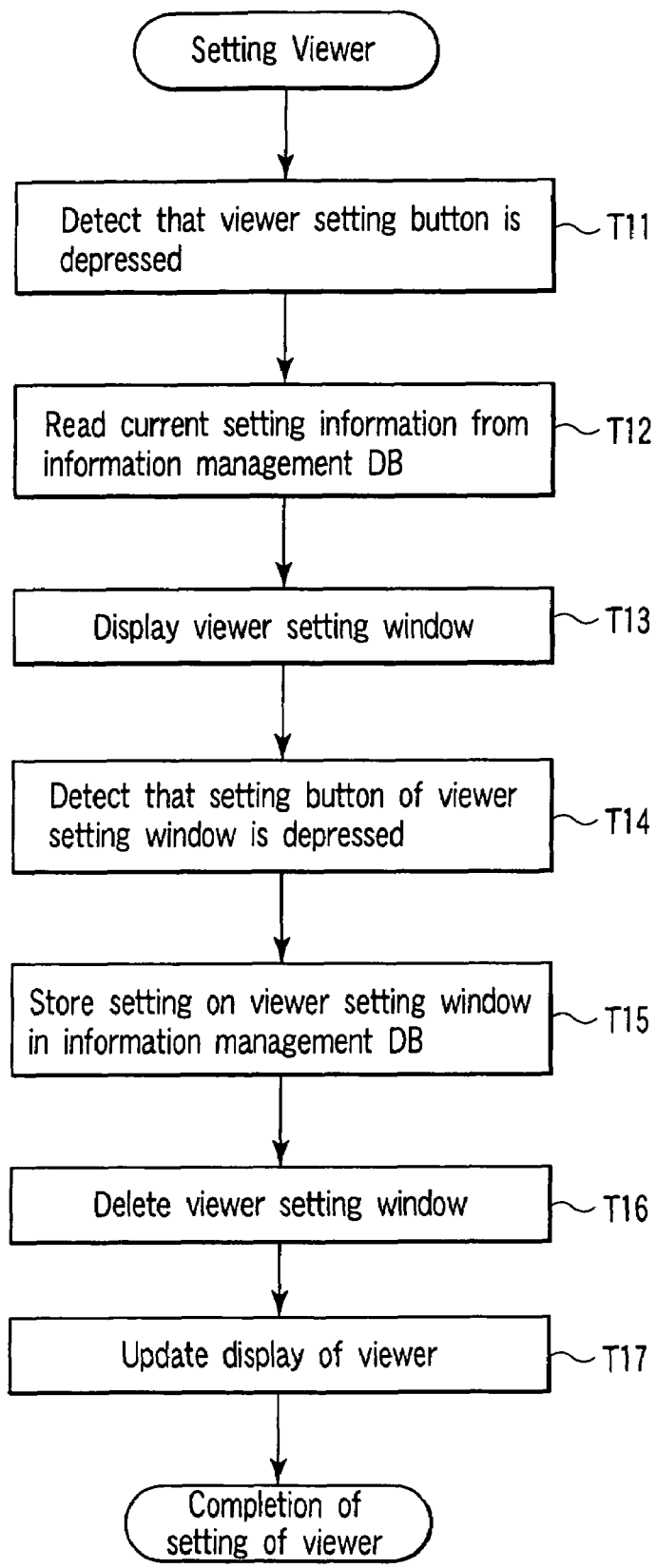
FIG. 15 is a schematic flowchart showing a procedure for performing a process of setting a viewer.

When the user operates the viewer setting button 8, the information displaying program performs a process of setting the viewer in step S10. FIG. 15 is a schematic flowchart showing a procedure of the viewer setting process.

In steps T11 to T13, if the information displaying program detects that the viewer setting button 8 is depressed, it reads the current setting information from the information management DB 27 and displays a viewer setting window.

Figure 16:
FIG. 16 is a diagram showing a viewer setting window.

FIG. 16 is a diagram showing a viewer setting window 16. In the viewer setting window 16, a method of displaying the viewers 5 for folders and a method of displaying the viewers 5 for files can be set.

For example, when the viewers 5 are displayed for files, the user can select one of the display of icons only, that of file information only and that of icons and file information in the viewer 5.

In the viewer setting window 16, the user can determine whether to display a plurality of previews within each of the viewers 5. Thus, the moving image and sound shown in FIG. 9 can be played back at the same time.

Returning to FIG. 15, the user depresses a "setting" button of the viewer setting window 16. In steps T14 to T17, the information displaying program detects that the "setting" button is depressed and stores the setting on the viewer setting window 16 in the information management DB 2. Then, the user deletes the viewer setting window 16 from the information displaying screen 1 and updates the display of each of the viewers 5 displayed on the screen. And the process returns.

Figure 17:
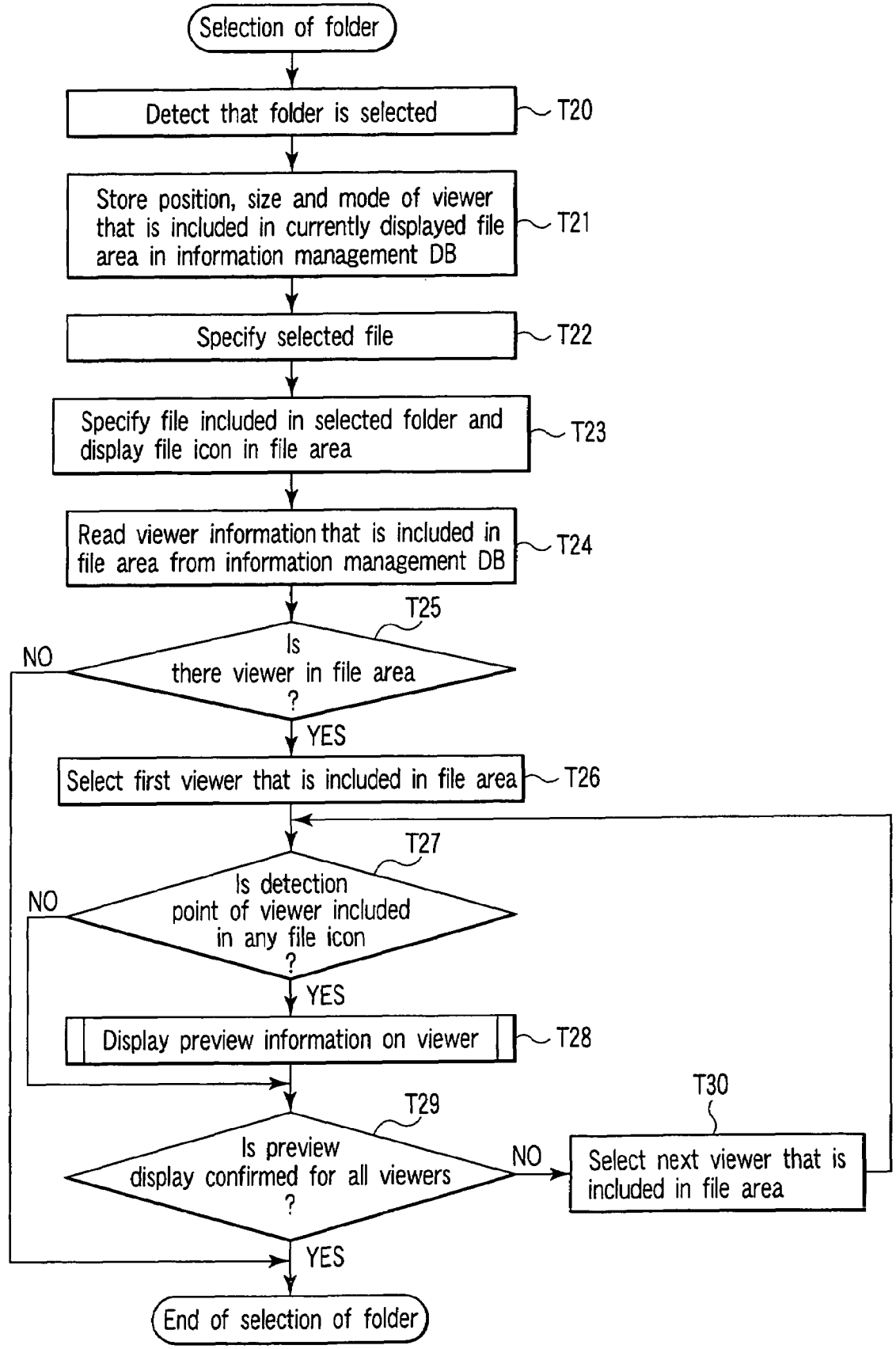
FIG. 17 is a schematic flowchart showing a procedure for performing a process of selecting a folder.

If the user clicks and selects a folder displayed in the folder area 3, the information displaying program performs a process of selecting the folder in step S11. FIG. 17 is a schematic flowchart showing a procedure of the folder selecting process.

In steps T20 and T21, if the information displaying program detects that the folder is selected, it stores viewer information such as the position, size and mode of each of the viewers 5 currently displayed in the file area in the information management DB 27. In steps T22 and T23, the information displaying program specifies the selected folder and displays the file icons 12 of files included in the selected folder in the file area 4.

In steps T24 to T26, the information displaying program reads the viewer information in the file area 4 from the information management DB 27 and selects one of the viewers 5 in the file area 5.

In steps T27 and T28, when the detection point of the selected viewer 5 is included in any of the file icons 12, the information displaying program performs a process of displaying the preview information on the viewer 5. The process in step T28 will be described in detail later.

If the preview display has not yet been confirmed for all the viewers 5 in step T29, one of the remaining viewers 5 in the file area 4 is selected in step T30, and the above processes in steps T27 to T29 are repeated.

If the preview display has been confirmed for all the viewers 5 in step T29, the folder selecting process ends. And the process returns.

When the information displaying program determines in step T27 that the detection point of the selected viewer is not included in the display area of any file icon 12, step T28 is skipped and nothing is displayed on the viewers. When the information displaying program determines in step T25 that the file area 4 has no viewers, steps T26 to T30 are skipped.

Figure 18:
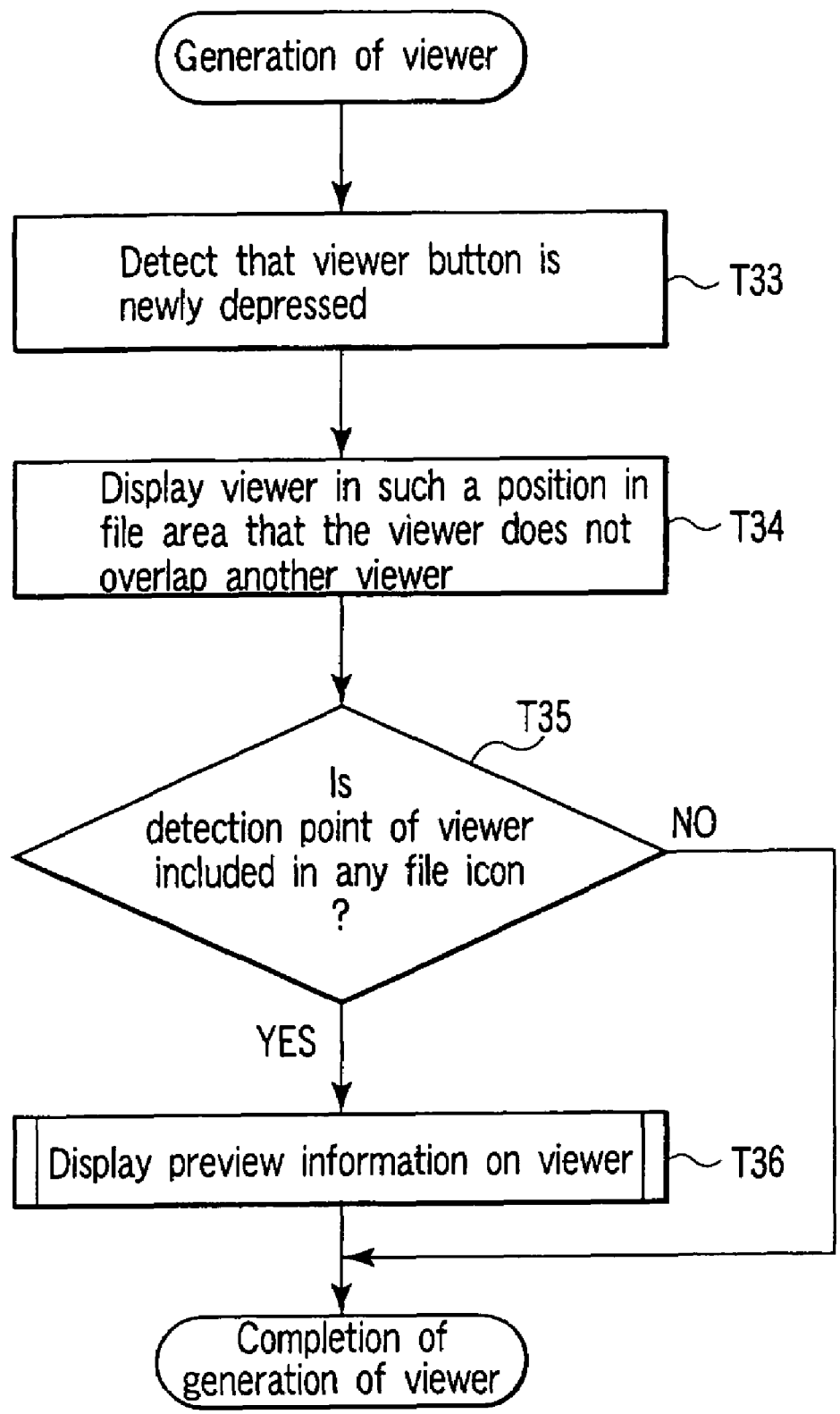
FIG. 18 is a schematic flowchart showing a procedure for performing a process of creating a viewer.

When the user operates the viewer generating button 6, the information displaying program performs a process of generating a viewer in step S12 in FIG. 11. FIG. 18 is a schematic flowchart showing a procedure for the viewer generating process.

In steps T33 and T34, when the information displaying program detects that the viewer generating button 6 is depressed, it displays a viewer 5 in such a position in the file area 4 that the viewer 5 does not overlap another viewer. In steps T35 and T36, when the detection point of the viewer 5 is included in any of the file icons 12, the program performs a process of displaying preview information on the viewer 5. If the detection point of the viewer 5 is not included in any of the file icons, step T36 is skipped. The process in step T36 will be described in detail later.

Figure 19:
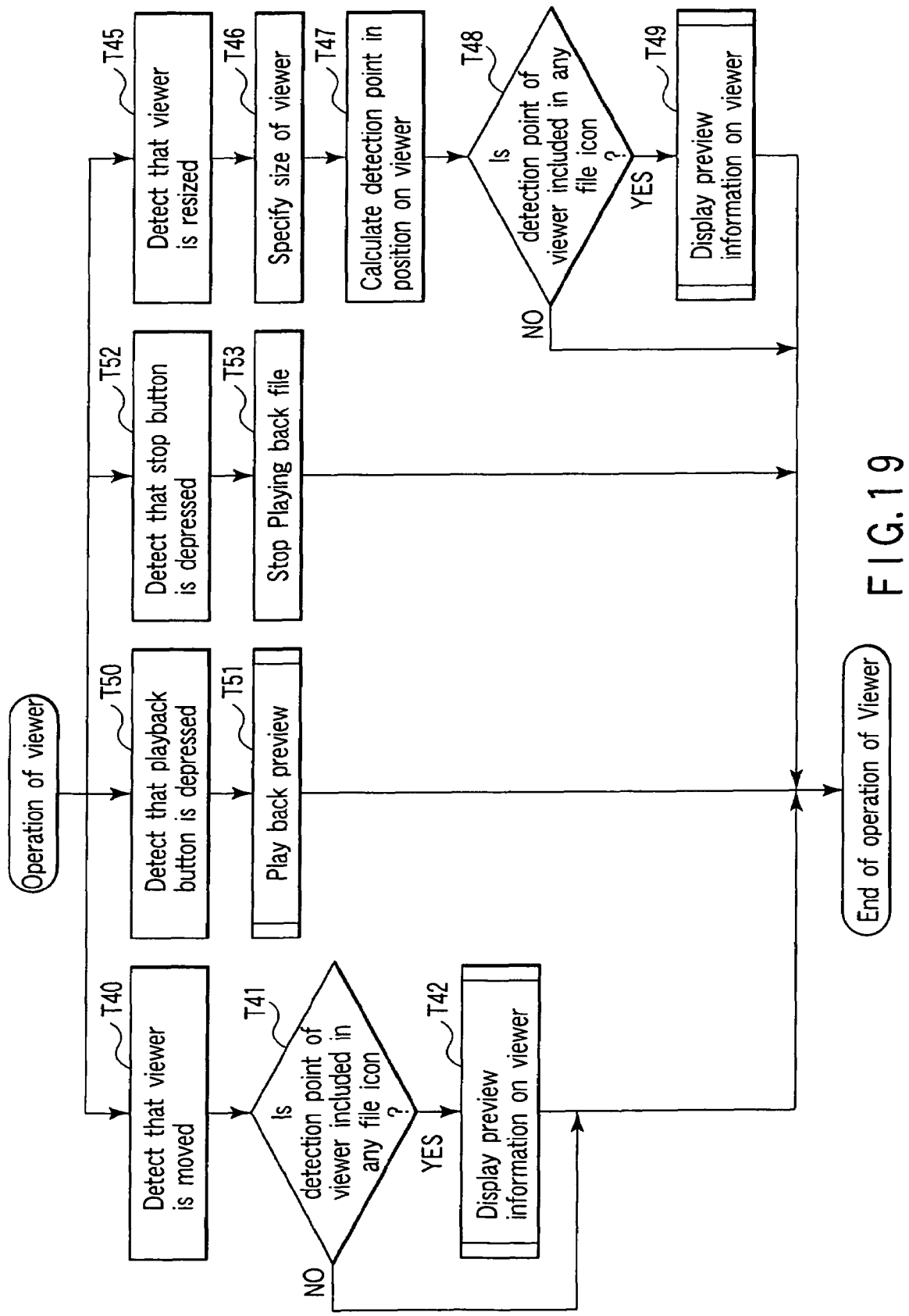
FIG. 19 is a schematic flowchart showing a procedure for performing a process of operating a viewer.

When the user performs any one of operations to move the display position of the viewer 5, change the size thereof, operate the playback button and operate the stop button, the information displaying program performs a process of operating the viewer in step S13 in FIG. 11. FIG. 19 is a schematic flowchart showing a procedure for the viewer operating process.

The user moves the viewer 5. Thus, in steps T40 to T42, the information displaying program detects that the viewer 5 is moved and checks whether the detection point of the viewer 5 is included in any of the file icons 12. If the detection point of the viewer 5 is included in any of the file icons 12, the program performs a process of displaying preview information on the viewer 5. If the detection point of the viewer 5 is not included in any of the file icons, step T42 is skipped. The process in step T42 will be described in detail later.

When the user changes the size of the viewer 5, the information displaying program detects that the viewer 5 is resized, specifies the size of the viewer and calculates the position of the detection point of the viewer 5 in steps T45 to T47. In steps T48 and T49, the program checks whether the detection point of the viewer 5 is included in any of the file icons 12. If the detection of the viewer 5 is included in any of the file icons 12, the program performs a process of displaying preview information on the viewer 5. If the detection point of the viewer 5 is not included in any of the file icons, step T49 is skipped. The process in step T49 will be described in detail later.

When the user depresses the playback button of the viewer 5, the information displaying program detects that the playback button is depressed and performs a process of playing back a preview in steps T50 and T51.

Figure 20:
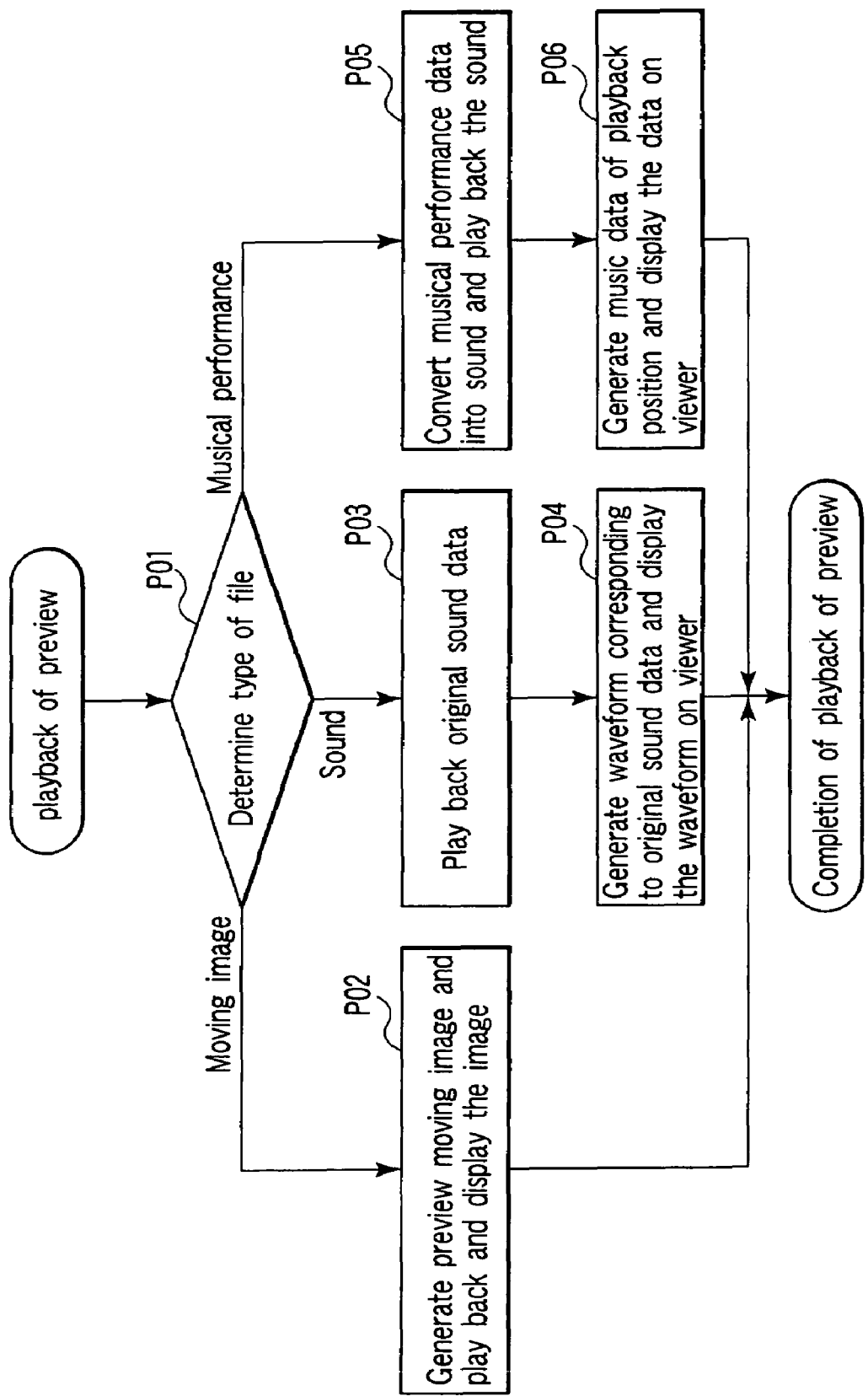
FIG. 20 is a schematic flowchart showing a procedure for performing a process of playing back a preview.

FIG. 20 is a schematic flowchart showing a procedure for the preview playing-back process. In step P01, the information displaying program specifies the type of a file.

When the file is a moving image file, the program generates a preview moving image and play backs and displays it on the viewer 5 in step P02. And the process returns.

When the file is a sound file, the program plays back original sound data and generates and displays a waveform corresponding to the original sound data on the viewer 5 in steps P03 and P04. And the process returns.

When the file is musical performance data, the program converts the musical performance data into sound and plays back the sound, and generates and displays music data corresponding to the playback position on the viewer 5 in steps P05 and P06. And the process returns.

Returning to FIG. 19, when the user depresses the stop button of the viewer 5, the information displaying program detects that the stop button is depressed and stops the playback of the file in steps T52 and T53.

Figure 21:
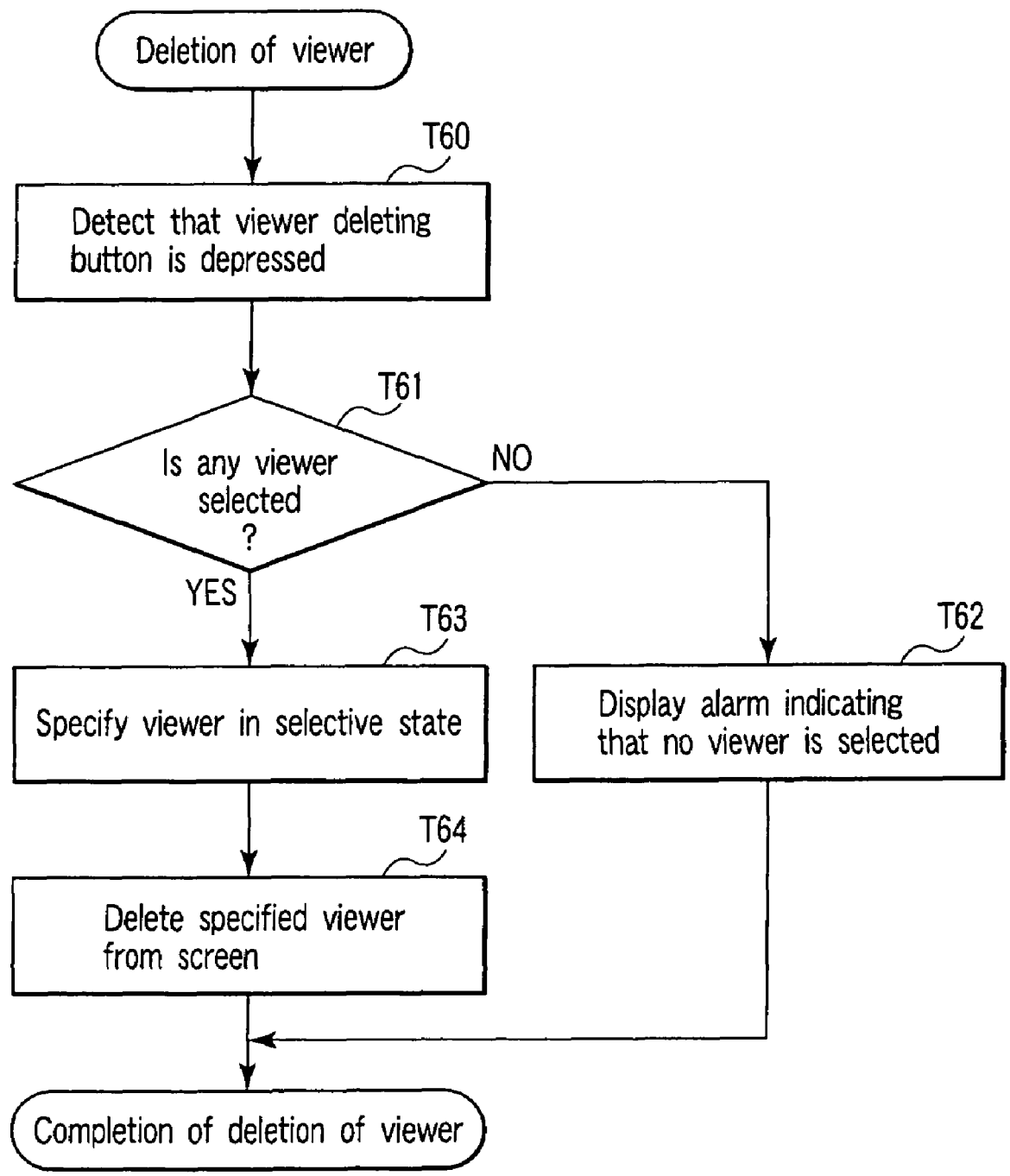
FIG. 21 is a schematic flowchart showing a procedure for performing a process of deleting a viewer.

When the user selects the viewer 5 and operates the viewer deleting button 7, the information displaying program performs the viewer deleting process of step S14 in FIG. 11. FIG. 21 is a schematic flowchart showing a procedure for the viewer deleting process.

In steps T60 and T61, when the information displaying program detects that the viewer deleting button 7 is depressed, it checks whether any viewer 5 is selected.

If no viewer 5 is selected, the program displays an alarm indicating that no viewer 5 is selected in step T62. And the process returns.

If a viewer 5 is selected, the viewer 5 in selective state is specified and deleted from the screen in steps T63 and T64. And the process returns.

In FIG. 11, when the user operates the exit button 9, the information displaying program detects that the exit button 9 is depressed and ends its execution in step S15.

Figure 22:
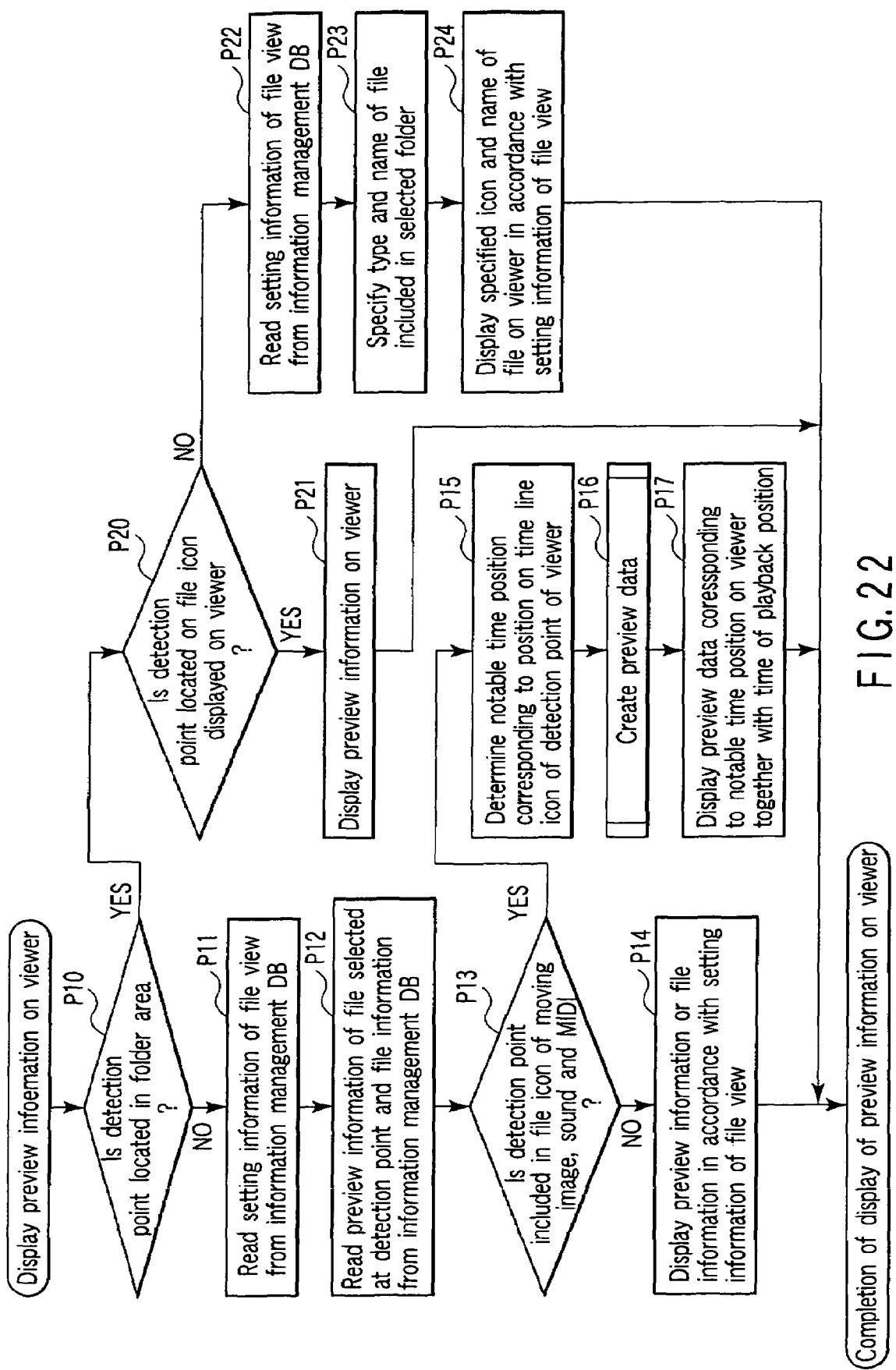
FIG. 22 is a schematic flowchart showing a procedure for performing a process of displaying preview information on a viewer.

Next, a process of displaying preview information on the viewer 5, which is performed by the information displaying program, will be described in detail. FIG. 22 is a schematic flowchart showing a procedure for performing the process of displaying preview information on the viewer 5.

In step P10, the information displaying program checks whether the detection point of the viewer 5 is located in the folder area 3.

When the detection point is not located in the folder area 3, or when it is located in the file area 4, the program reads setting information of files of the viewer setting window 16 from the information management DB 27 and also reads preview information and file information of a file selected at the detection point from the information management DB 27 in steps P11 and P12.

In step P13, the program checks whether the detection point is included in the file icon 12 of a file that stores a moving image, sound and musical performance data.

When the detection point is not included in the file icon 12 of a file that stores a moving image, sound and musical performance data, or when the detection point is included in the file icon 12 of a file that stores static information, the preview information or file information is displayed on the viewer 5 in accordance with the setting information about the files of the viewer setting window 16 in step P14.

When the detection point is included in the time line icon 14 of a file that stores a moving image, sound and musical performance data, the program determines a notable time position corresponding to a position on the time line icon 14 of the detection point of the viewer 5 and performs a process of creating preview data before and after the time position in steps P15 and P16.

Figure 23:
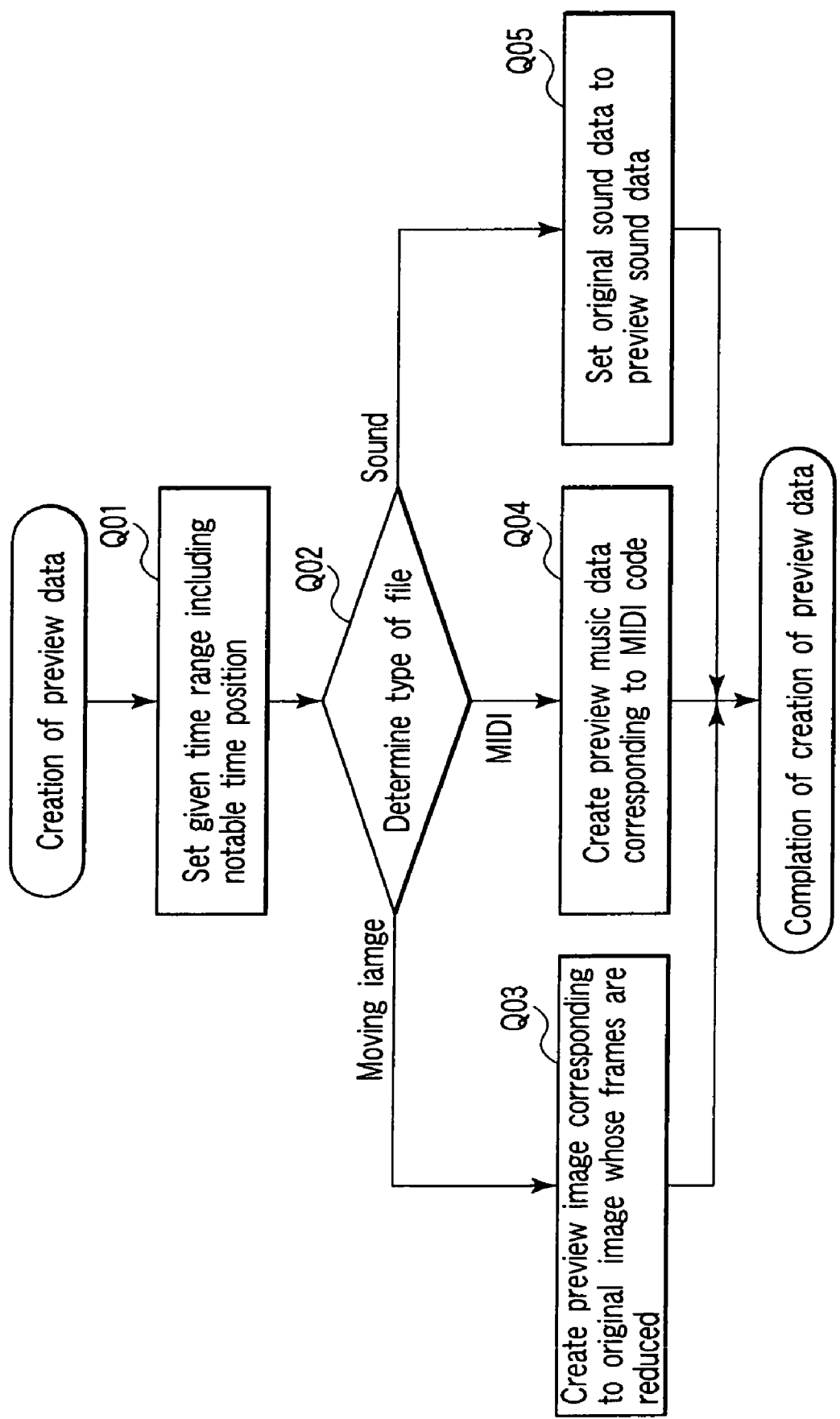
FIG. 23 is a schematic flowchart showing a procedure for performing a process of creating preview data.

FIG. 23 is a schematic flowchart showing a procedure for the preview data creating process. In step Q01, the information displaying program sets a given time range including the notable time position as a time range for creating a preview. In step Q02, the information displaying program specifies the type of the file.

If the file is a moving image file, in step Q03, the program creates a preview image corresponding to the original image whose frames are reduced in the time range set in step Q01. And the process returns.

If the file is musical performance data, in step Q04, the program creates preview music data corresponding to a musical performance code in the time range set in step Q01. And the process returns.

If the file is a sound file, in step Q05, the program creates waveform data corresponding to the original sound data and sets it to the preview sound data. And the process returns.

Returning to FIG. 22, the preview data corresponding to the notable time position is displayed on the viewer 5 together with the time of the playback position in step P17.

When the detection point is located in the folder area 3 in step P10 shown in FIG. 22, the information displaying program checks whether the detection point is located on the file icon 12 displayed on another viewer 5 in step P20.

When the detection point is located on the file icon 12 displayed on another viewer 5, the program displays preview information of a file specified by the file icon 21 on the viewer in step P21.

In steps P20 and P21, if the detection point is located not on the file icon but on the file name, the preview of the file specified by the file name can be displayed.

When the detection point is not located on the file icon 12 displayed on the viewer 5, the information displaying program reads the setting information of a folder in the viewer setting window from the information management DB 27 and specifies the file type and file name included in a selected folder in steps P22 and P23. In step P24, the specified file icon or file name is displayed on the viewer 5 in accordance with the setting information of the folder.

The process of displaying preview information on the viewer 5 is performed by the foregoing procedure.

The detection point of the viewer 5 will be described. The size of the viewer 5 can be varied, and so can be the number of detection points in accordance with the length and width of the viewer 5.

Figure 24:
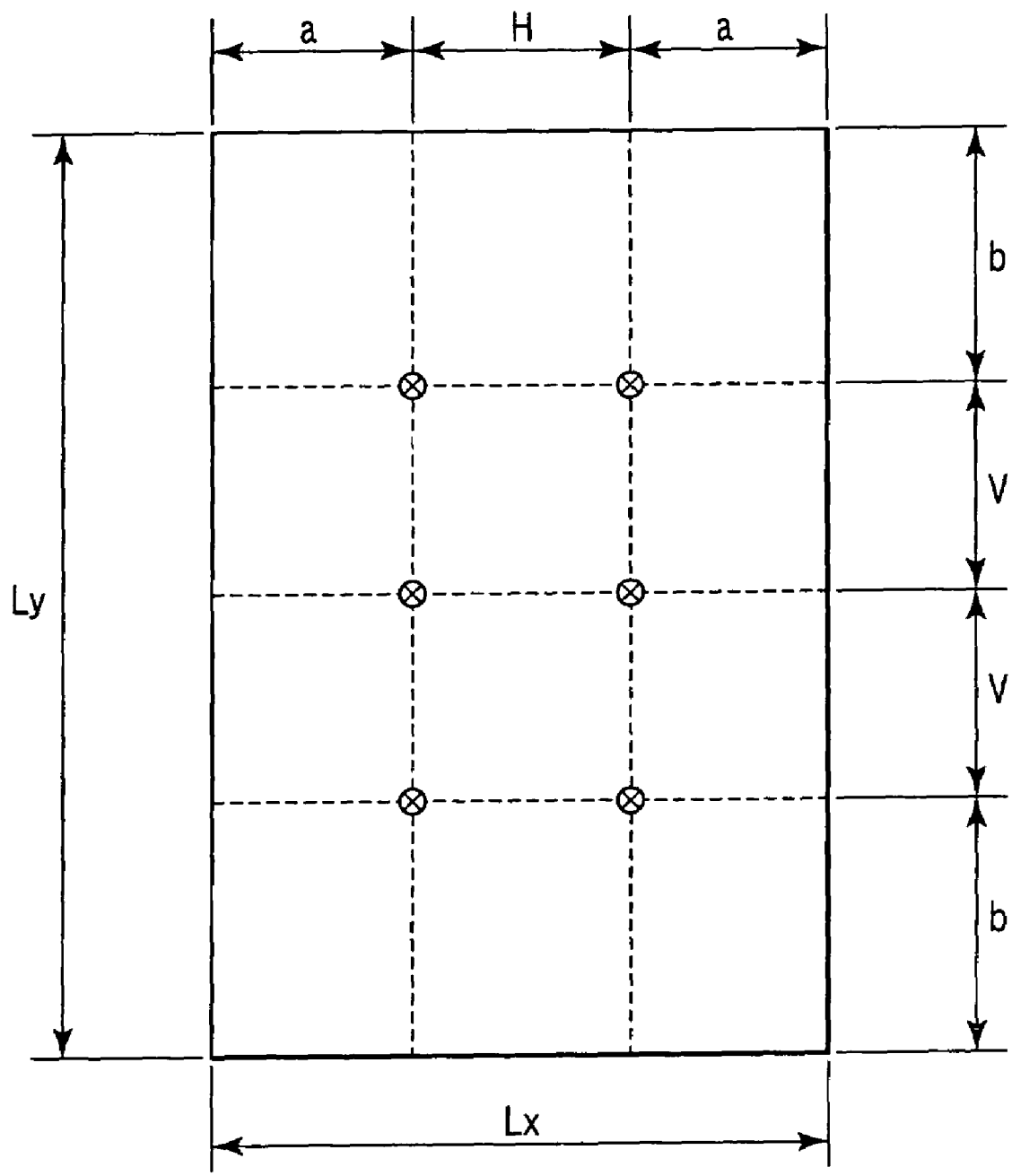
FIG. 24 is an illustration of a method of calculating a plurality of detection points.

FIG. 24 is an illustration of a method of calculating a plurality of detection points.

The detection points are arranged at the intersections of meshes such that a horizontal interval between the intersections is H and a vertical interval therebetween is V. Each of the detection points is located at not less than at least a given distance a away from either side of the viewer and a given distance b away from either end thereof. As the viewer increases in size by V in the vertical direction and H in the horizontal direction, the detection points increase in number. The file icons 12 displayed in the file area are arranged at the intersections of a given grid. The horizontal interval between the intersections of the grid is equal to H and the vertical interval therebetween is equal to V. The smallest horizontal distance of the viewer is $2a$ and the smallest vertical distance thereof is $2b$.

In FIG. 24, two rectangles each having a width of H and a length of V can be set in the internal area that is located a distance a away from either side and a distance b away from either end. Accordingly, six detection points are set in FIG. 24.

A plurality of detection points enable a plurality of previews to be displayed on a single viewer 5.

In the information displaying method according to the embodiment described above, a movable viewer can be displayed on a screen to preview a folder as well as a file. The user can thus retrieve a desired file with a simple operation.

Further, the viewer can preview a file with a lapse of time such as a moving image and sound as well as a still image. Such a file can thus be retrieved with efficiency.

The respective functions of the above embodiment can be configured using hardware, or the programs in which the functions are described by software can be read in and executed by a computer. The functions can also be configured appropriately by selecting one of software and hardware.

Furthermore, the functions can be executed by reading the programs stored in a recording medium (not shown) into a computer. A recording medium according to the embodiment of the present invention can record programs and can be used whatever its recording mode if its programs can be read by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information displaying apparatus including a file memory which stores files hierarchically, an information reading unit which reads file information associated with the files from the file memory, and a display which displays the information of the files read by the information reading unit, comprising:

a mark displaying unit which displays on the display a file mark to identify each of the files stored in the file memory and a folder mark to identify a folder by which the files are grouped;

a viewer generating unit which generates on the display a plurality of viewers each having a display area, wherein each of the viewers is freely movable;

a viewer moving unit which selects one of the viewers displayed on the display and moves the selected viewer freely on the display in accordance with a drag operation; and a preview displaying unit which (A) displays in the display area of the selected viewer a file mark of a file included in the folder when the selected viewer is moved and the display area of the selected viewer overlaps the folder mark displayed on the display, (B) displays in the display area of the selected viewer the file information associated with the file when the selected viewer is moved and the display area of the selected viewer overlaps the file mark, (C) displays in a display area of the selected viewer, a file mark of a file included in a second folder mark which has already been displayed in the display area of a second viewer when the selected viewer is moved and the display area of the selected viewer overlaps the second folder mark, and (D) displays in the display area of the selected viewer information associated with a file corresponding to a second file mark displayed in the second viewer when the selected viewer is moved and the display area of the selected viewer overlaps the second file mark displayed in the display area of the second viewer.

2. The information displaying apparatus according to claim 1, wherein the folder mark is at least one of graphics representing a folder and a character representing the folder and the file mark is at least one of graphics representing a file and a character representing a name of the file.

3. The information displaying apparatus according to claim 2, wherein the information associated with the files included in the folder is one of an icon representing the file and a name of the file.

4. The information displaying apparatus according to claim 1, wherein the information associated with the files included in the folder is one of an icon representing the file and a name of the file.

5. The information displaying apparatus according to claim 1, wherein the display area displays a reduced image of an image associated with the file when the file is an image file, an image representing a waveform of sound associated with the file when the file is a sound file, and music representing scales associated with the file when the file is a musical performance file including musical instrument digital interface (MIDI) data.

6. The information displaying apparatus according to claim 5, wherein the viewer plays back at least one of a movie, sound and musical performance information.

7. The information displaying apparatus according to claim 6, wherein when the information associated with the file is one of the movie, sound and musical performance information, an icon of the file has a shape to show a lapse of time, and the viewer moves along the shape of the icon while playing back the information.

8. The information displaying apparatus according to claim 1, wherein the viewer varies in size and displays information on a plurality of files simultaneously.

9. The information displaying apparatus according to claim 1 wherein the viewer moving unit includes a user-controllable component used to select and drag the viewer within the display in accordance with a user's input.

10. A recording medium that records an information displaying program of an information displaying apparatus including a file memory which stores files hierarchically and a display which displays information associated with the files stored in the file memory, the information displaying program of the recording medium causing a computer to perform:

a mark displaying process of displaying on the display a file mark to identify each of the files stored in the file memory and a folder mark to identify a folder by which the files are grouped;

a viewer generating process of generating on the display a plurality of viewers each having a display area, wherein each of the viewers is freely movable;

a viewer moving process of selecting one of the viewers displayed on the display and moving the selected viewer freely on the display in accordance with a drag operation; and a preview displaying process of (A) displaying in the display area of the selected viewer a file mark of a file included in the folder when the selected viewer is moved and the display area of the selected viewer overlaps the folder mark displayed on the display, (B) displaying in the display area of the selected viewer the file information associated with the file within the viewer when the selected viewer is moved and the display area of the selected viewer overlaps the file mark displayed on the display, (C) displaying in a display area of the selected viewer, a file mark of a file included in a second folder mark which has already been displayed in the display area of a second viewer when the selected viewer is moved and the display area of the selected viewer overlaps the second folder mark, and (D) displaying in the display area of the selected viewer information associated with a file corresponding to a second file mark displayed in the second viewer when the selected viewer is moved and the display area of the selected viewer overlaps the second file mark displayed in the display area of the second viewer.

11. The recording medium according to claim 10, wherein the folder mark is at least one of graphics representing a folder and a character representing the folder and the file mark is at least one of graphics representing a file and a character representing a name of the file.

12. The recording medium according to claim 11, wherein the information associated with the files included in the folder is one of an icon representing the file and a name of the file.

13. The recording medium according to claim 10, wherein the information about the files associated with the folder is one of an icon representing the file and a name of the file, 14. The recording medium according to claim 10, wherein the display area displays a reduced image of an image associated with the file when the file is an image file, an image representing a waveform of sound associated with the file when the file is a sound file, and music representing scales associated with the file when the file is a musical performance file including musical instrument digital interface (MIDI) data.

15. The recording medium according to claim 14, wherein the viewer plays back at least one of a movie, sound and musical performance information.

16. The recording medium according to claim 15, wherein when the information associated with the file is one of the movie, sound and musical performance information, an icon of the file has a shape to show a lapse of time, and the viewer moves along the shape of the icon while playing back the information.

17. The recording medium according to claim 10, wherein the viewer varies in size and displays information on a plurality of files simultaneously.

18. The recording medium according to claim 10, wherein the viewer moving process of moving the view on the display includes selecting and dragging the viewer within the display in accordance with a user's input.

* * * * *